United States Patent
Hwang

[11] Patent Number: 5,995,675
[45] Date of Patent: *Nov. 30, 1999

[54] DEFECT COMPENSATOR FOR SOLID-STATE IMAGE PICKUP DEVICE

[75] Inventor: Sung Hoon Hwang, Seoul, Rep. of Korea

[73] Assignee: LG Semicon Co., Ltd., Chungcheongbuk-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/683,453

[22] Filed: Jul. 18, 1996

[30] Foreign Application Priority Data

Jul. 22, 1995 [KR] Rep. of Korea ...................... 95-21735

[51] Int. Cl.$^6$ ................................ G06K 9/40; H04N 1/04
[52] U.S. Cl. .......................... 382/268; 358/474; 358/483; 348/246; 348/250
[58] Field of Search .................................... 382/268, 246, 382/247; 358/482, 483, 474, 471; 348/246, 249, 250

[56] References Cited

U.S. PATENT DOCUMENTS

| | | | |
|---|---|---|---|
| 4,894,721 | 1/1990 | Matsuda | 348/247 |
| 5,327,246 | 7/1994 | Suzuki | 348/246 |
| 5,329,381 | 7/1994 | Payne | 358/455 |
| 5,331,420 | 7/1994 | Yamano et al. | 348/246 |
| 5,381,175 | 1/1995 | Sudo et al. | 348/246 |

Primary Examiner—Thomas D. Lee

[57] ABSTRACT

A defect compensator for a solid-state image pickup device includes a vertical charge coupled device (VCCD) region for transferring signal charges produced by a plurality of optical detectors which detects an image signal of incident light, in the vertical direction, a buffer for storing a pixel data in the VCCD region by means of a plurality of scanning lines unit sequentially, a defect detecting and compensating part having a plurality of matrix shaped sub-windows which calculate sum value of peripheral pixels except a central pixel upon receipt of the pixel data of the buffer, a plurality of sum-windows which divide sum value calculated by the corresponding sub-windows into a plurality of blocks to calculate their average value, a defect determining part which determines the presence of the defect upon comparing the average value with the central pixel value, and a compensation pixel value determining part which determines a defect compensation value upon comparing an arbitrary peripheral pixel value from the corresponding sub-windows with the average value calculated by the corresponding sum-windows, and a multiplexer for selectively outputting either a pixel data in which the defect compensation has been completed in accordance with an output signal of the defect determining part or a pixel data in which the defect has not been compensated.

28 Claims, 5 Drawing Sheets

DEFECT COMPENSATOR FOR SOLID-STATE IMAGE PICKUP DEVICE

BACKGROUND OF THE INVENTION

1. Field of the Invention

The present invention relates to a solid-state image pickup device, and more particularly, to a defect compensator for a solid-state image pickup device in which a white defect or a black defect in a cell is compensated inside a charge coupled device (CCD).

2. Discussion of the Related Art

Figure 1:
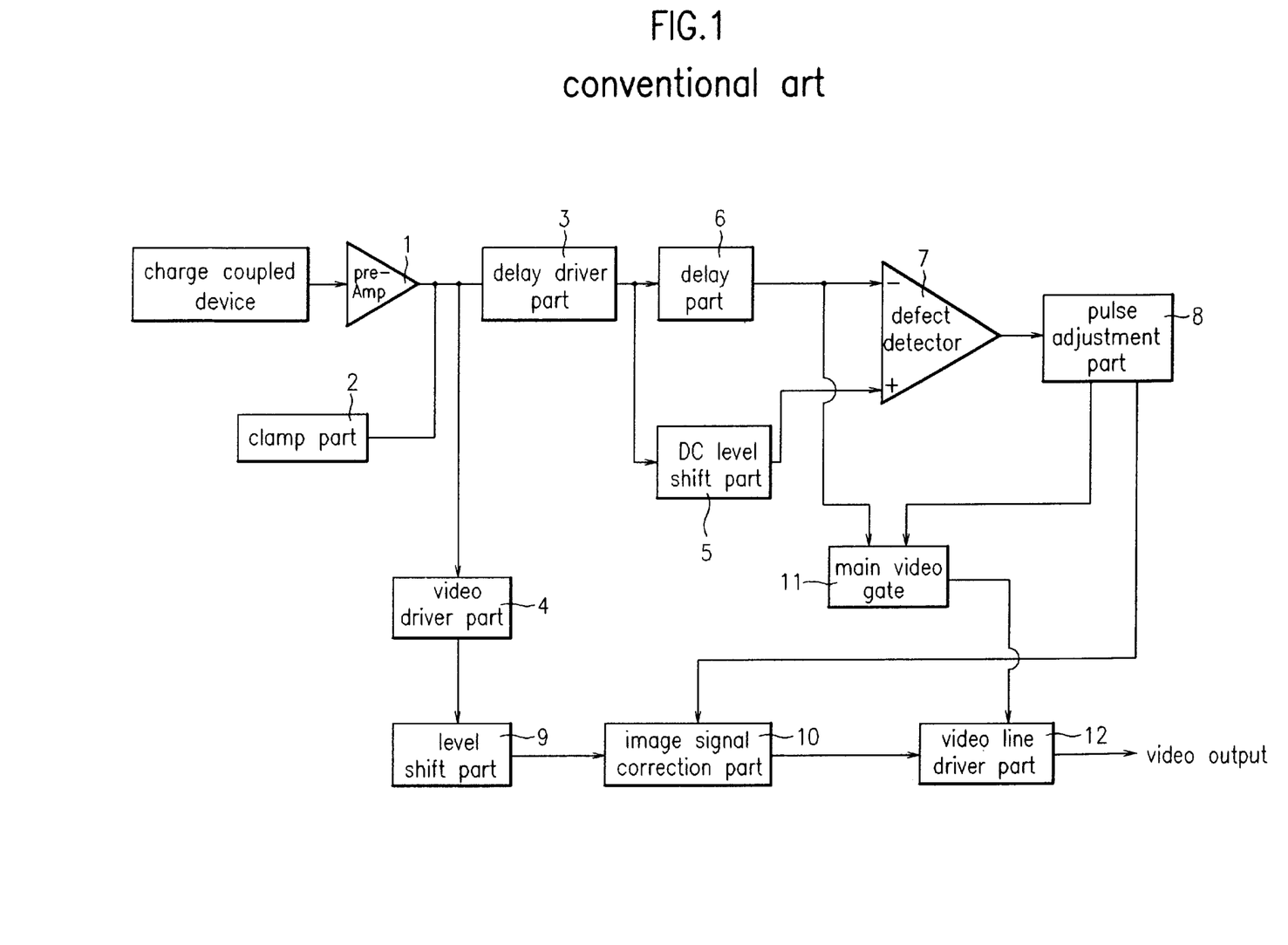
FIG. 1 is a configuration block of a conventional defect compensator for a solid-state image pickup device.

A conventional defect compensator for a solid-state image pickup device will be explained with reference to FIG. 1. FIG. 1 is a block diagram describing the components of a conventional defect compensator for a solid-state image pickup device. A signal output from a pre-amplifier 1 is input to a clamp part 2, a delay driver part 3 and a video driver part 4. The clamp part 2 fixes the output signal from the pre-amplifier 1 at a constant reference level. A signal output from the delay driver part 3 is input to DC level shift part 5 and; delay part 6. The delay part 6 delays an output signal of the delay driver part 3 for a certain time period. A defect detector 7 detects output signals from the delay part 6 and the DC level shift part 5, and outputs a control pulse to compensate a defect. A pulse adjustment part 8 delays the output pulse of the defect detector 7 for a certain time period and adjusts the width of the output pulse. The normal signal applied to the video driver part 4 is input to a level shift part 9. An image signal correction part 10 is controlled by the control signal of the pulse adjustment part 8 upon receipt of the output signal from the level shift part 9. A main video gate 11 is also controlled by the control signal of the pulse adjustment part 8. A video line driver part 12 outputs a signal selected by the control signal of the pulse adjustment part 8.

The operation of the conventional defect compensator for a solid-state image pickup device arranged as described above will now be explained. As shown in FIG. 1, the pre-amplifier 1 amplifies an image signal input from a charge coupled device (CCD) and the clamp part 2 fixes the amplified signal at a constant reference level.

The output signal of the pre-amplifier 1 is applied to the delay driver part 3 and the video driver part 4, respectively. The signal output from the delay driver part 3 is delayed for about 115 ns by a delay clock at the delay part 6.

The delayed signal from delay part 6 and delayed signal and the level shifted signal from the DC level shift part 5 are input to the defect detector 7 to be compared with each other. If the signal difference between the two signals is larger than a reference signal, the defect detector 7 generates an output trigger pulse.

The trigger pulse is delayed by the pulse adjustment part 8 for a certain time period to adjust the width of the pulse. Then, the trigger pulse is input to the image signal correction part 10 and the main video gate 11, respectively.

As a result, the defect is determined by comparing neighboring pixels one another. That is, when two pixels exist on the same chip, the video output signal for real time is compared with the delayed signal to determine the defect.

When the delayed signal is the same as the current video output signal or has little difference from the current video output signal, the current video output signal is finally output. When the delayed signal is larger than the current video output signal, a signal following to the current video signal is finally output. Therefore, the output of the video line driver part 12 is selectively controlled by the output trigger pulse of the defect detector 7.

However, the conventional defect compensator has several problems.

First, the configuration of hardware is complicated since the defect is compensated outside CCD device. This causes the defect compensator to be sensitive to noise.

Second, the resolution is degraded since the level difference for only two pixels, i.e., the current pixel and the following pixel, is detected and compared.

SUMMARY OF THE INVENTION

Accordingly, the present invention is directed to a defect compensator for a solid-state image pickup device that substantially obviates one or more of the problems caused by limitations and disadvantages of the related art.

An object of the present invention is to provide a defect compensator for a solid-state image pickup device in which the defect is compensated inside CCD and the scale of the system is considerably diminished.

Another object of the present invention is to realize a precise defect compensation using pixel windows and to increase the yield of wafer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the defect compensator for a solid-state image pickup device according to the present invention includes: a vertical charge coupled device (VCCD) region for transferring signal charges produced by a plurality of optical detectors which detect an image signal of incident light, in the vertical direction; a buffer for storing a pixel data in the VCCD region by means of a plurality of scanning lines unit sequentially; a defect detecting and compensating part having a plurality of matrix shaped sub-windows which calculate sum value of peripheral pixels except a central pixel upon receipt of the pixel data of the buffer, a plurality of sum-windows which divide sum value calculated by the corresponding sub-windows into a plurality of blocks to calculate their average value, a defect determining part which determines the presence of the defect upon comparing the average value with the central pixel value, and a compensation pixel value determining part which determines a defect compensation value upon comparing an arbitrary peripheral pixel value from the corresponding sub-windows with the average value calculated by the corresponding sum-windows; and a multiplexer for selectively outputting either a pixel data in which the defect compensation has been completed in accordance with an output signal of the defect determining part or a pixel data in which the defect has not been compensated.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and which are incorporated in and constitute a part of this specification, illustrate embodiments of the invention. Together with the description, these drawings serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

A defect compensator for a solid-state image pickup device according to the present invention will now be described in detail with reference to the appended drawings.

Figures 2, 2A, 2B:
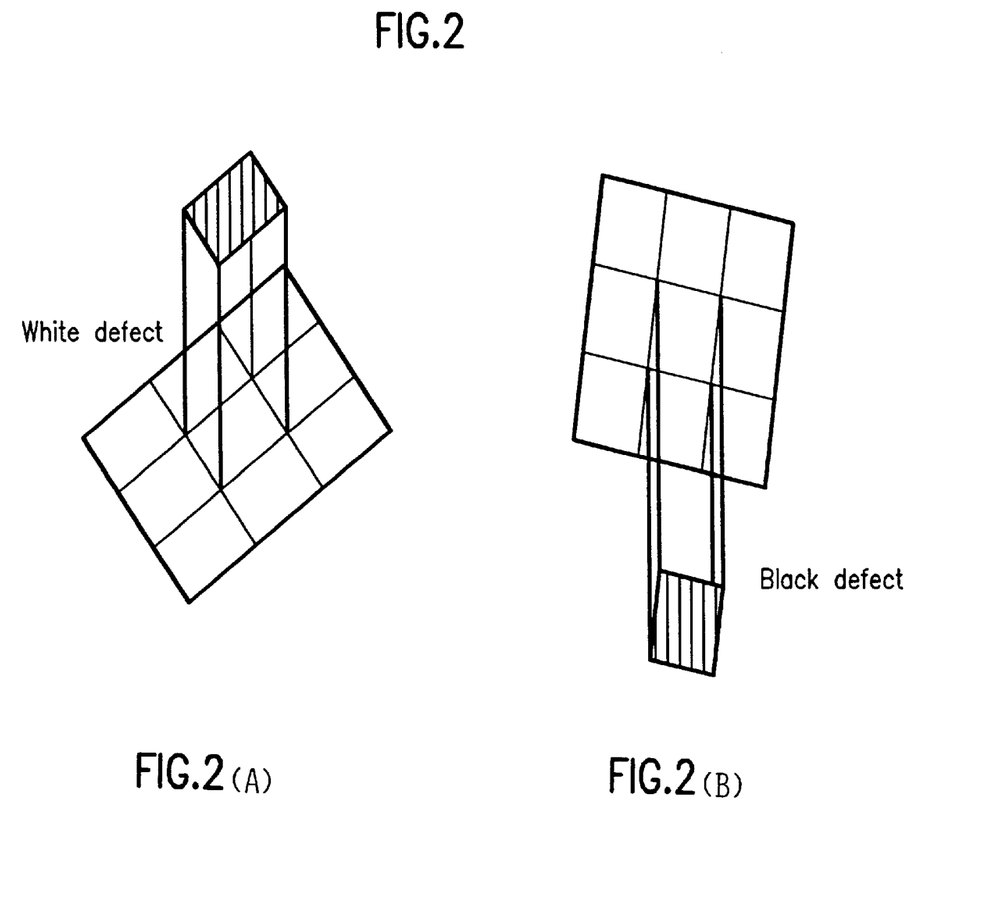
FIGS. 2(A) and 2(B) show white and black defects of 3×3 window according to the present invention.

FIG. 2 shows an example of white and black defects. When a defect exists on a central pixel of 3×3 window, the central pixel value has a considerable difference compared with the pixel values of peripheral pixels. The presence of the defect may be determined by comparing the central pixel with the peripheral pixels.

Figure 3:
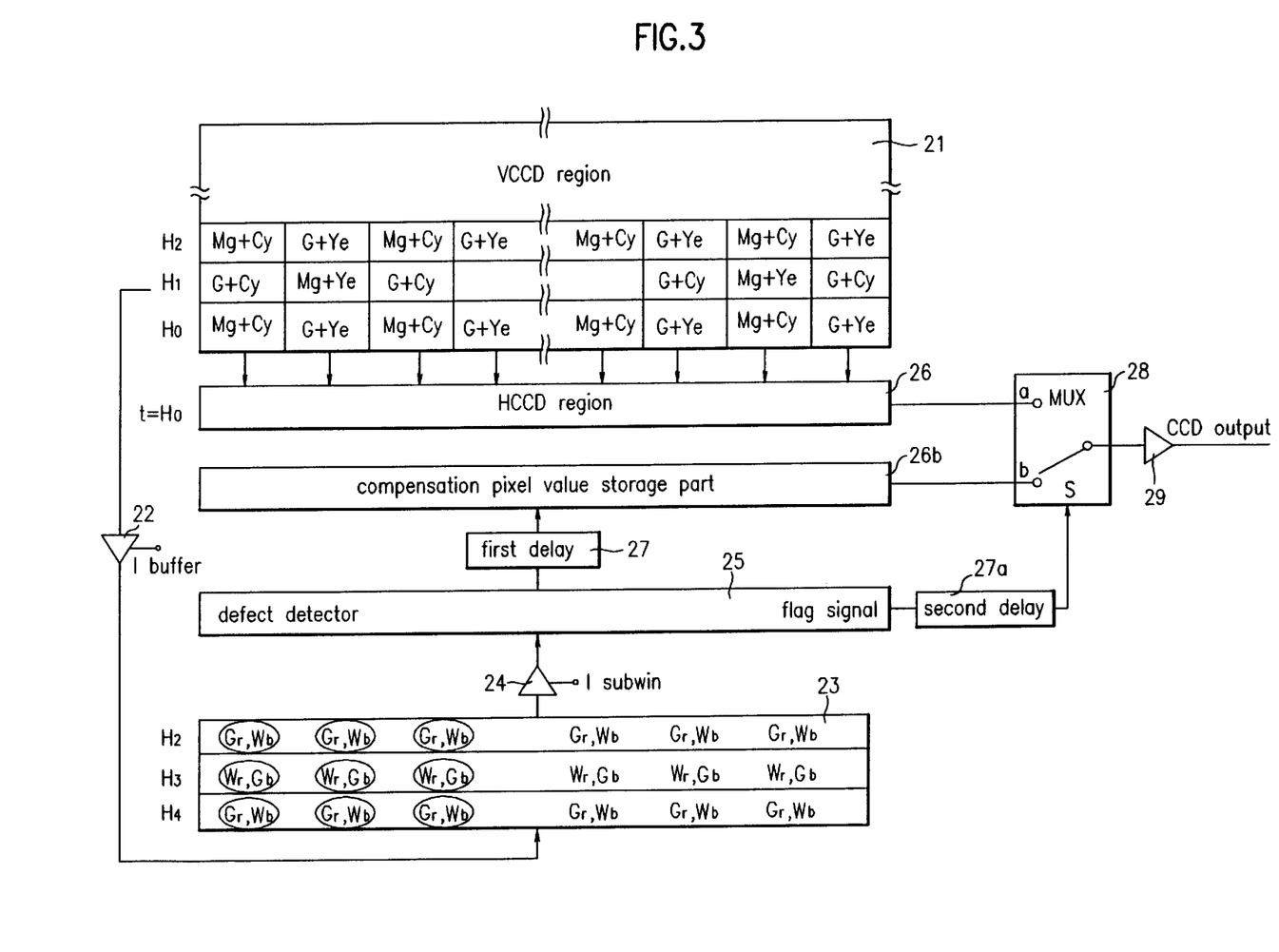
FIG. 3 is a configuration block of a defect compensator for a solid-state image pickup device according to the present invention.

Referring to FIG. 3, the defect compensator for a solid-state image pickup device according to the present invention includes a plurality of a vertical charge coupled device (VCCD) region 21, a first sensing amplifier 22, a temporary buffer 23, a second sensing amplifier 24, a defect detector 25, a horizontal charge coupled device(HCCD) region 26, a pixel data in the HCCD region 26, a first delay 27, a pixel data in which the defect from the defect detector 25 has been compensated, a multiplexer 28 and a third sensing amplifier 29. A plurality of the VCCD region 21 transfers signal charges from a plurality of optical detectors (photodiodes) in the vertical direction. The first sensing amplifier 22 senses and amplifies a plurality of scanning lines of the VCCD region 21. The temporary buffer 23 temporarily stores pixel data from a plurality of the scanning lines. The second sensing amplifier 24 sequentially senses and amplifies the data stored in the temporary buffer 23. The defect detector 25 divides the data from the second sensing amplifier 24 into sub-windows (3×3 window) detects a defect and determines a compensation pixel value by comparing a central pixel value with pixel values of peripheral pixels. The compensated pixel values determined by defect detector 25 is stored in compensation pixel value storage part 26b. The HCCD region 26 has a pixel value from the VCCD region 21 in which the defect has not yet been compensated. The first delay 27 compensates time difference between the pixel data being output by the defect compensation. Second delay 27a delays a flag signal output from defect detector 25. The multiplexer 28 receives the pixel data from the HCCD region, received a delay flag signal from defect detector 25 indicating whether the current pixel has a defect or not and receives compensated pixel data from compensation pixel value storage part 26b. Multiplexer 28 selects final output data based on the pixel data received from HCCD 26 or the compensated pixel data received from compensated pixel value storage part 26b. The third sensing amplifier 29 senses and amplifies the signal output from the multiplexer and amplifies it.

The operation of the defect compensator for a solid-state image pickup device, arranged as described above, will now be explained with reference to FIG. 3 to FIG. 6.

As shown in FIG. 3, three horizontal scanning lines in the VCCD region 21 are stored in the temporary buffer 23 in the form of (Gr,Wb) and (Wr,Gb) through the first sensing amplifier(not shown). Each pixel value in the VCCD region 21 can be expressed as Mg+Cy=Wb, G+Ye=Gr, Mg+Ye=Wr and Cy+G=Gb. (Wb,Gr) and (Wr,Gb) are marked by P.

At the point of $t=H_0$, a pixel value of a first horizontal line $H_0$ in the VCCD region 21 is transferred to the HCCD region 26. Subsequently, each data of the horizontal lines is stored in the temporary buffer 23. Thus, at $t=H_2$, each pixel data is stored in the order of third horizontal line $H_2$, fourth horizontal line $H_3$ and fifth horizontal line $H_4$.

Each luminous signal Y=(Mg+G+Ye+Cy)/2 stored in the temporary buffer 23 is transferred to a plurality of windows in the defect detector 25 by the control signal "1 subwin" of the second sensing amplifier (not shown). The data stored in the temporary buffer 23 is then divided into a plurality of sub-windows (for example, 3×3 window), where the plurality of sub-windows have data in the form of m×n.

Figure 5:
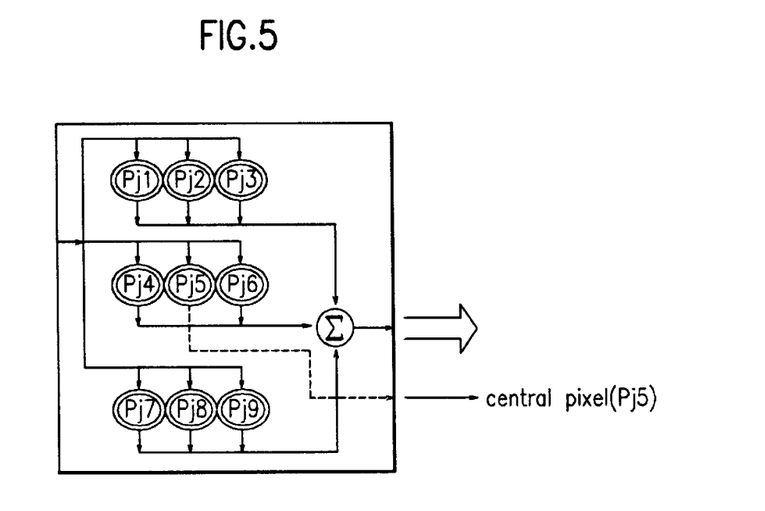
FIG. 5 shows a block for calculating a sum value of peripheral pixel values of an m×n window according to the present invention.

As shown in FIG. 5, a first sub-window 30 among a plurality of the sub-windows stores the data stored in the temporary buffer 23 in the form of 3×3 window and sums luminous components of the peripheral pixels, excluding the luminous component a central pixel Pj5.

That is, to sum the luminous components the first sub-window 30 stores the data stored in the temporary buffer 23 as follows:

$$\begin{vmatrix} Pj1 & Pj2 & Pj3 \\ Pj4 & Pj5 & Pj6 \\ Pj7 & Pj8 & Pj9 \end{vmatrix}$$

A second sub-window 30a fetches the data from the temporary buffer 23 as follows:

$$\begin{vmatrix} Pj2 & Pj3 & Pj11 \\ Pj5 & Pj6 & Pj14 \\ Pj8 & Pj9 & Pj17 \end{vmatrix}$$

As aforementioned, a third sub-window, a fourth sub-window and an nth sub-window are shifted line-by-line, respectively and the data is stored to calculate the sum value of each luminous component.

Figure 4:
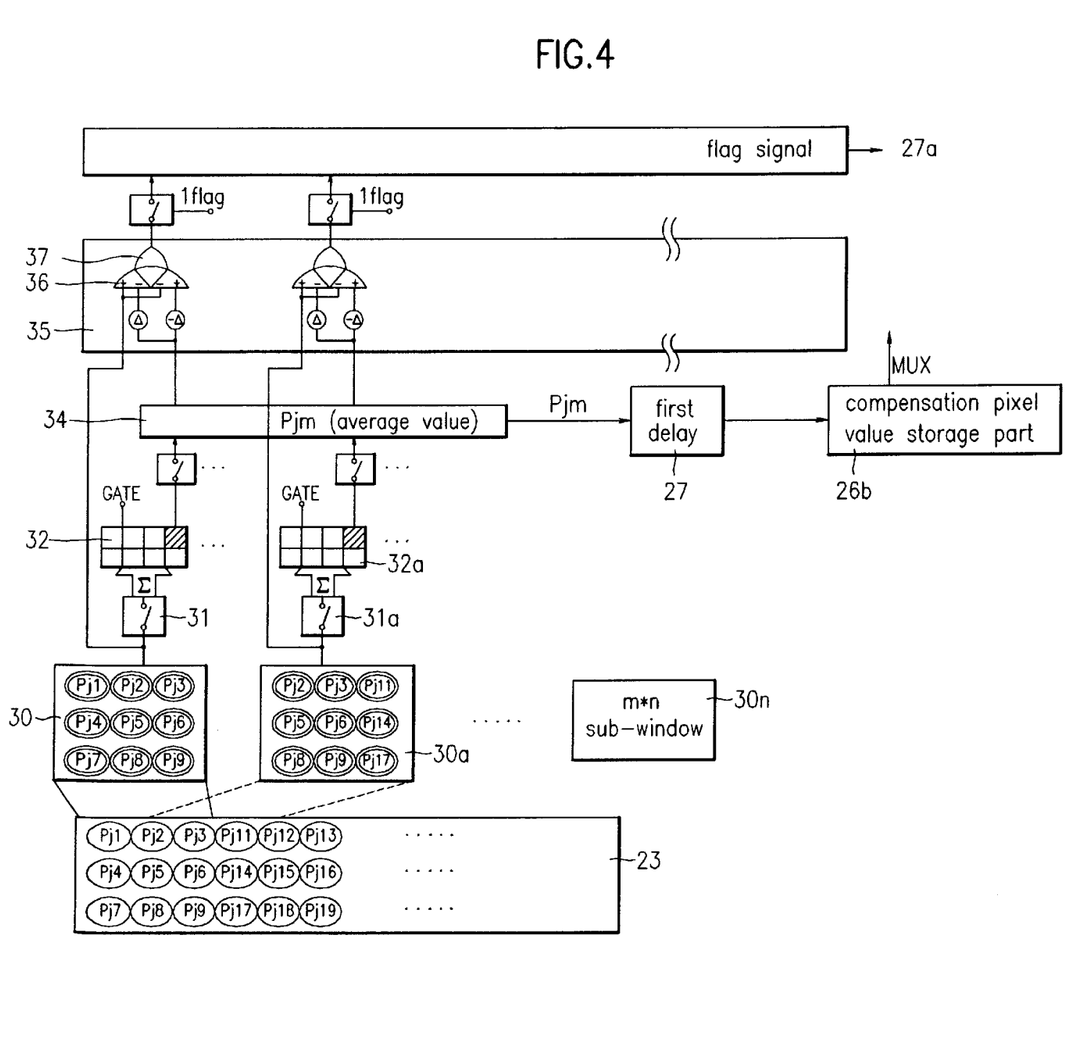
FIG. 4 is a partial detailed block of a defect compensator for a solid-state image pickup device according to the present invention.

As shown in FIG. 4, the sum value by the first sub-window 30 is applied to a plurality of sum-windows through a sum switch 31. A first sum-window 32 among a plurality of the sum-windows receives luminous components summed by the first sub-window 30 and calculates their average value.

The second sub-window 30a connected to a second sum-window 32a through a sum switch 31a, and calculates an average value Pjm of the corresponding luminous components.

Figure 6:
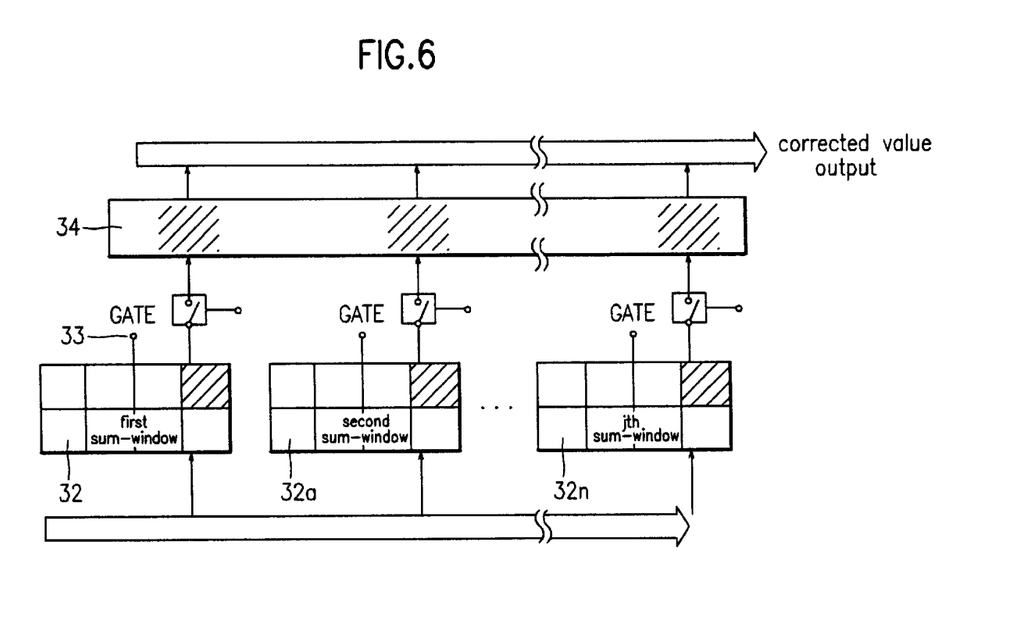
FIG. 6 shows a block for calculating the average value of sum-windows according to the present invention.

The first and second sum-windows 32 and 32a are divided into eight blocks respectively by the gate signal as shown in FIG. 6. The eight blocks are filled with an average value of the peripheral pixels, excluding a central pixel. A gate 33 is used as a floating gate for dividing charges in each sum-window region.

An average value Pjm of luminous components calculated by the first sum-window 32 is stored in an average value storage CCD 34 through each switch. Likewise, an average value calculated by the second sum-window 32a is stored in the average value storage CCD 34.

A compensation pixel value determining part 26a receives the average value Pjm of luminous components from the average value storage CCD 34, fetches pixel values Pj4 and Pj6 from the first sub-window 30, and determines a compensation value by applying the following rules:

If $|Pj4-Pj6|<X$ then Pj5 is input instead of Pj4 or Pj6, else if $(|Pjm-Pj4|>|Pjm-Pj6|)$ then Pj5 is input instead of Pj6 or Pj4, wherein, X is a random value and Pj5 is a corrected pixel value (Wr, Gb) or (Gr, Wb).

That is, a compensation value is determined for the second sub-window 30a and the other sub-windows by comparing the pixel value at only left and right sides of central pixel with the average value of luminous components. The compensated pixel value is input to a compensation pixel value storage part 26b through the first delay 27.

A defect determining part 35 includes a plurality of comparators 36 and OR gate 37. The defect determining part 35 receives a central pixel value Pj5 of the first sub-window 30 and the average value Pjm of the luminous components from the first average value storage CCD 34 to compare them with each other.

The comparators 36 include a first comparator and a second comparator. The central pixel value of the sub-window is input to a positive(+) terminal of the first comparator. The average value of the peripheral pixel value is input to a negative(−) terminal of the first comparator. The central pixel value of the sub-window is input to a negative (−) terminal of the second comparator. The average value of the peripheral pixel value is input to a positive (+) terminal of the second comparator.

The defect determining part 35 compares the average value Pjm of luminous components with the central pixel value Pj5. When the average value Pjm is larger than the central pixel value Pj5, the defect is determined as a white defect. When the average value Pjm is the same as the central pixel value Pis, the defect is determined as a black defect.

The presence of the defect in the current pixel can be determined by the following expression.

$$SUMj = \sum_{i=1}^{n} Pji$$

$$Pjm = SUMj / (N - 1)$$

Wherein, i is the peripheral pixel values except the central value "5", j is a sub-window number, N is the number of sub-windows.

If $|(Pjm-Pj5)|>\Delta$, a central pixel of the sub-window is determined as a white defect or a black defect.

Thus, The output value of the OR gate 37 logically operated by the output signal of the comparator 36 becomes "1".

If $|(Pjm-Pj5)|=\Delta$, it means that the central pixel of the sub-window 30 is a normal pixel. Thus, the output value of the OR gate 37 becomes "0".

$\Delta$ is variable and shows the difference value between the central pixel and the peripheral pixels in the sub-window 30. In addition, $\Delta$ acts on a reference which determines a defect.

The output of the OR gate 37 determines a flag signal through a switch controlled by a control signal flag as shown in FIG. 4. That is, the flag signal is input to a selection signal of the multiplexer 28 through the second delay 27a as shown in FIG. 3.

The selection signal of the multiplexer 28 determines as to whether the current pixel has a defect or is normal. The data in the HCCD region 26 is finally output or the data (defect compensated pixel value) in the compensation pixel value determining part 26a is output upon being regarded the current output signal as a defect according to the flag signal value ("0" or "1").

Final defect compensation value is synchronized by the pixel transfer clock and applied to terminals a and b in the multiplexer 28 as shown in FIG. 3.

The pixel data in the HCCD region 26 or the compensated pixel data in the compensation pixel value determining part 26a is output according to the flag signal.

In the second embodiment of the defect compensator for a solid-state image pickup device according to the present invention, when the data in the VCCD region 21 is transferred to the temporary buffer 23, a single horizontal scanning line is transferred to the first line of the temporary buffer 23. When the next horizontal scanning line is transferred, the current line of the temporary buffer 23 is shifted in the next line.

Thereafter, the operation of the defect compensator is identical to the first embodiment according to the present invention.

The third embodiment according to the present invention shows the defect compensator for compensating the defect in series using the sub-window 30 and the sum-window 32, and the first average value storage CCD 34 and the comparator 36 one-by-one respectively. In the first and second embodiments as shown in FIG. 4, to transfer the data in the temporary buffer 23 to the sub-window 30 the defect determining part 35 having a plurality of mxn sub-windows, sum-windows, comparators and OR gates has been required. However, in the third embodiment, the defect detector 25 comprises a single mxn sub-window, a sum-window, a comparator, and an OR gate.

As aforementioned, the defect compensator for a solid-state image pickup device has the following effects.

The circuit processing according to the defect compensation is performed inside CCD as compared with the conventional defect compensation performed outside CCD. As a result, it is possible to minimize the scale of the overall system.

In addition, the defect is efficiently detected using the pixel window to improve the yield of the wafer.

It will be apparent to those skilled in the art that various modifications and variations can be made in the defect compensator for solid-state image pickup device of the present invention without departing from the spirit or scope of the invention. Thus, it is intended that the present invention cover the modifications and variations of this invention provided they come within the scope of the appended claims and their equivalents.

What is claimed is:

1. A defect compensator for a solid-state image pickup device comprising:
a vertical charge coupled device (VCCD) region for transferring pixel data produced by a plurality of optical detectors which output an image signal in response to incident light;

a buffer for storing pixel data in the VCCD region using a plurality of scanning lines sequentially;

a horizontal charge coupled device region for transferring the pixel data;

defect detecting and compensating means including, a plurality of matrix shaped sub-windows which calculate a sum value of peripheral pixels other than a central pixel, upon receipt of the pixel data of the buffer, a plurality of sum-windows which divide the sum value calculated by the corresponding sub-windows into a plurality of blocks to calculate an average value, defect determining means for determining the presence of the defect based on a comparison of the average value with the central pixel value, compensation pixel value determining means for determining a defect compensation value, and a compensation pixel value storage part for respectively storing and outputting the defect compensation value; and a multiplexer for selectively outputting either pixel data in which the defect compensation has been completed or pixel data in which the defect has not been compensated in accordance with an output of the defect determining means, wherein the defect compensation is performed based on the defect compensation value stored in the compensation pixel value storage part.

2. The defect compensator for a solid-state image pickup device as claimed in claim 1, wherein the pixel data in the VCCD region, which is input to the defect detecting and compensating means, is stored in a buffer through a first sensing amplifier sequentially.

3. The defect compensator for a solid-state image pickup device as claimed in claim 1, wherein the compensated pixel data is input to a compensated pixel value storage means through a first delay.

4. The defect compensator for a solid-state image pickup device as claimed in claim 3, wherein the first delay acts on the delay means for compensating time between the pixel data from the HCCD region and the pixel data from the defect detecting and compensating means.

5. The defect compensator for a solid-state image pickup device as claimed in claim 1, wherein a selection signal of the multiplexer is input through a second delay for delaying a flag signal of the defect detecting and compensating means for a certain time period.

6. The defect compensator for a solid-state image pickup device as claimed in claim 1, wherein each data corresponding to scanning lines in the VCCD region is sequentially transferred to the buffer.

7. The defect compensator for a solid-state image pickup device as claimed in claim 1, wherein the defect detecting and compensating means consists of a matrix shaped sub-window, a sum-window, a defect determining means, and a compensation pixel value storage part, arranged in series.

8. The defect compensator for a solid-state image pickup device as claimed in claim 7, wherein the defect determining means comprises:

a plurality of comparators for receiving a central pixel value and an average value of luminous components, and an OR gate for performing logical operations on the output value of the comparators.

9. The defect compensator for a solid-state image pickup device as claimed in claim 8, wherein the comparators comprise:

a first comparator in which a central pixel value of the sub-window is input to a positive(+) terminal thereof and an average value of peripheral pixel value is input to a negative(−) terminal thereof, and a second comparator in which a central pixel value of the sub-window is input to a negative(−) terminal thereof and an average value of peripheral pixel value is input to a positive(+) terminal thereof.

10. The defect compensator for a solid-state image pickup device as claimed in claim 1, wherein an output signal of the defect determining means is input to the multiplexer as a selection signal.

11. The defect compensator for a solid-state image pickup device as claimed in claim 1, wherein the presence of the defect is determined based on whether:

$$SUMj = \sum_{i=1}^{n} Pji,$$

and $$Pjm = SUMj/(N-1),$$

where i includes numerals other than 5, j is a sub-window number, and N is the number of sub-windows.

12. The defect comparator of claim 1, wherein the compensation pixel value determining means determines the defect compensation value based on a comparison of the difference between two peripheral pixel values with a random value.

13. The defect comparator of claim 1, wherein the compensation pixel value determining means determines the defect compensation value based on a comparison of the difference between an average value of peripheral pixels and a first peripheral pixel value with the difference between an average value of peripheral pixels and a second peripheral pixel value.

14. A defect compensator for a solid-state image pickup device comprising:

a vertical charge coupled device (VCCD) region for transferring pixel data produced by a plurality of optical detectors which output an image signal in response to incident light;

a buffer for storing pixel data in the VCCD region using a plurality of scanning lines sequentially;

a horizontal charge coupled device region for transferring the pixel data;

a defect detecting and compensating part including, a plurality of matrix shaped sub-windows which calculate a sum value of peripheral pixels other than a central pixel, upon receipt of the pixel data of the buffer, a plurality of sum-windows which divide the sum value calculated by the corresponding sub-windows into a plurality of blocks to calculate an average value, a defect determining part that determines the presence of the defect based on a comparison of the average value with the central pixel value, a compensation pixel value determining part that determines a defect compensation value, and a compensation pixel value storage part for respectively storing and outputting the defect compensation value; and a multiplexer for selectively outputting either pixel data in which the defect compensation has been completed or pixel data in which the defect has not been compensated in accordance with an output of the defect determining part, wherein the defect compensation is performed based on the defect compensation value stored in the compensation pixel value storage part.

15. The defect comparator of claim 14, wherein the compensation pixel value determining part determines the defect compensation value based on a comparison of the difference between two peripheral pixel values with a random value.

16. The defect comparator of claim 14, wherein the compensation pixel value determining part determines the defect compensation value based on a comparison of the difference between an average value of peripheral pixels and a first peripheral pixel value with the difference between an average value of peripheral pixels and a second peripheral pixel value.

17. The defect compensator for a solid-state image pickup device as claimed in claim 14, wherein the pixel data in the VCCD region, which is input to the defect detecting and compensating part, is stored in a buffer through a first sensing amplifier sequentially.

18. The defect compensator for a solid-state image pickup device as claimed in claim 14, wherein the compensated pixel data is input to a compensated pixel value storage port through a first delay.

19. A defect compensator for a solid-state image pickup device as claimed in claim 18, wherein the first delay compensates time between the pixel data from the HCCD region and the pixel data from the defect detecting and compensating port.

20. The defect compensator for a solid-state image pickup device as claimed in claim 14, wherein a selection signal of the multiplexer is input through a second delay for delaying a flag signal of the defect detecting and compensating port for a certain time period.

21. The defect compensator for a solid-state image pickup device as claimed in claim 14, wherein each data corresponding to scanning lines in the VCCD region is sequentially transferred to the buffer.

22. The defect compensator for a solid-state image pickup device as claimed in claim 14, wherein the defect detecting and compensating part includes a matrix shaped sub-window, a sum-window, a defect determining part, and a compensation pixel value storage part, arranged in series.

23. The defect compensator for a solid-state image pickup device as claimed in claim 22, wherein the defect determining part comprises:
  a plurality of comparators for receiving a central pixel value and an average value of luminous components, and
  an OR gate for performing logical operations on the output value of the comparators.

24. The defect compensator for a solid-state image pickup device as claimed in claim 23, wherein the comparators comprise:
  a first comparator in which a central pixel value of the sub-window is input to a positive(+) terminal thereof and an average value of peripheral pixel value is input to a negative(−) terminal thereof, and
  a second comparator in which a central pixel value of the sub-window is input to a negative(−) terminal thereof and an average value of peripheral pixel value is input to a positive(+) terminal thereof.

25. The defect compensator for a solid-state image pickup device as claimed in claim 14, wherein an output signal of the defect determining port is input to the multiplexer as a selection signal.

26. The defect compensator for a solid-state image pickup device as claimed in claim 14, wherein the presence of the defect is determined based on whether:

$$SUMj_{1-1}{''}=\Sigma Pji,$$

and $$Pjm=SUMj/(N-1),$$

where i includes numerals other than 5, j is a sub-window number, and N is the number of sub-windows.

27. A method of compensating defects in images generated from pickup devices, comprising:
  calculating a sum value of peripheral pixels other than a central pixel upon receipt of the pixel data;
  dividing the sum value into a plurality of blocks to calculate an average value;
  detecting a defect based on a comparison of the average value with the central pixel value;
  determining a defect compensation value when a defect is detected; and
  selectively outputting either pixel data in which the defect compensation has been completed or pixel data in which the defect has not been compensated in accordance with whether a defect is detected, wherein the defect compensation is performed based on the defect compensation value, wherein the defect compensation value is determined based on a comparison of the difference between two peripheral pixel values with a random value.

28. A method of compensating defects in images generated from pickup devices, comprising:
  calculating a sum value of peripheral pixels other than a central pixel upon receipt of the pixel data;
  dividing the sum value into a plurality of blocks to calculate an average value;
  detecting a defect based on a comparison of the average value with the central pixel value;
  determining a defect compensation value when a defect is detected; and
  selectively outputting either pixel data in which the defect compensation has been completed or pixel data in which the defect has not been compensated in accordance with whether a defect is detected, wherein the defect compensation is performed based on the defect compensation value, wherein the defect compensation value is determined based on a comparison of the difference between an average value of peripheral pixels and a first peripheral pixel value with the difference between an average value of peripheral pixels and a second peripheral pixel value.

* * * * *